United States Patent [19]

Pan et al.

[11] Patent Number: 5,102,696
[45] Date of Patent: Apr. 7, 1992

[54] METHOD OF DISPERSING FLUOROPOLYMERS ON POLYCARBONATE RESINS

[75] Inventors: Wie-Hin Pan, Evansville, Ind.; Randall A. Reed, Essex Jct., Vt.

[73] Assignee: General Electric Company, Mt. Vernon, Ind.

[21] Appl. No.: 499,838

[22] Filed: Mar. 27, 1990

[51] Int. Cl.$^5$ ............................................. B05D 7/24
[52] U.S. Cl. ................................. 427/222; 427/242; 427/424
[58] Field of Search .................. 427/222, 242, 424; 525/146; 264/134

[56] References Cited

U.S. PATENT DOCUMENTS

| | | | |
|---|---|---|---|
| 3,005,795 | 10/1961 | Busse et al. | 525/146 |
| 3,290,412 | 12/1966 | Goldblum | 525/146 |
| 3,294,871 | 12/1966 | Schmitt et al. | 525/146 |
| 4,391,935 | 7/1983 | Bialous et al. | 524/82 |
| 4,496,643 | 1/1985 | Wilson et al. | 430/110 |
| 4,632,953 | 12/1986 | Dozzi | 524/239 |
| 4,649,168 | 3/1987 | Kress et al. | 524/130 |
| 4,753,994 | 6/1988 | Carter, Jr. et al. | 525/146 |
| 4,772,655 | 9/1988 | Krishnan et al. | 524/437 |
| 4,826,900 | 5/1989 | Ogoe et al. | 525/146 |

FOREIGN PATENT DOCUMENTS

| | | | |
|---|---|---|---|
| 269950 | 6/1988 | European Pat. Off. | |
| 1025694 | 4/1966 | United Kingdom | 427/222 |

*Primary Examiner*—Michael Lusignan
*Assistant Examiner*—Terry J. Owens
*Attorney, Agent, or Firm*—Martin B. Barancik; Joseph T. Eisele

[57] ABSTRACT

Fluoropolymers in the form of solid particles of specified diameter and dispersed in water are added and mixed with polycarbonate resin particles at a rate of 0.1 to 9 liter/hour to obtain a uniform coating of the fluoropolymer on the polycarbonate resin particles. The proportion of fluoropolymer added is from 0.01 to about 70 parts for each 100 parts by weight of polycarbonates and mixing is carried out to continually bring polycarbonate resin particles (non-contacted) into contact with the fluoropolymer dispension as it is added.

5 Claims, No Drawings

METHOD OF DISPERSING FLUOROPOLYMERS ON POLYCARBONATE RESINS

BACKGROUND OF THE INVENTION

1. Field of the Invention

The invention relates to polycarbonate resins and more particularly to blends of polycarbonate resins with fluoropolymers such as polytetrafluoroethylene resin.

2. Brief Description of the Prior Art

Prior hereto it was known that synthetic and/or inorganic polymers such as glass could be coated with polytetrafluoroethylene (hereinafter referred to at times as "PTFE") to improve their soil release properties and to enhance their durability; see for example U.S. Pat. No. 3,968,297. In the latter patent, the method of coating comprises first applying a base coat of a tetravalent titanium oxide polymer, a zirconium oxide polymer or a tin oxide polymer. The base coat is then top coated with an unsintered aqueous dispersion of polytetrafluoroethylene particles.

It has also been proposed heretofore to coat elastomeric materials such as butadiene-acrylonitrile copolymers with unsintered polytetrafluoroethylene particles by first softening the polymer surface with a solvent and adhering the polytetrafluoroethylene particles to the softened surface; see for example U.S. Pat. No. 3,200,006. In U.S. Pat. No. 3,511,682 a method is described wherein the elastomer is coated with a thin film of polytetrafluoroethylene and then the film is sintered with an open flame on the elastomer surface.

More recently, the prior art has recognized the use of PTFE as an additive to polycarbonate resins, resulting in the enhancement of certain physical properties associated with the polycarbonate and useful in thermoforming processes. Polycarbonate resins having a degree of porosity are not just coated with the additive PTFE, but physically incorporate the PTFE into their particle structure. Early processes for incorporating PTFE into the polycarbonate resins included admixture and processing of the polycarbonate and the PTFE (in a latex) in a ball mill, a rubber mill, an extruder or a Banbury mixer; see for example the description in U.S. Pat. Nos. 3,294,871 and 3,290,795. In U.S. Pat. No. 3,005,795, it is suggested that admixture of the PTFE and the polycarbonate resin take place in "highly-fluid solutions and melts" of the base resin.

Most recently, it has been found advantageous to combine the PTFE and a polycarbonate resin by coprecipitation of the two resins. This is said to result in the ultimate in dispersion of the PTFE into the polycarbonate resin; see the description in the U.S. Pat. No. 4,753,994.

We have now found that the procedure followed for the physical admixture of the fluoropolymer, particularly PTFE, with a polycarbonate resin is important to a homogeneous incorporation of the fluoropolymer. A dispersing addition of the fluoropolymer in latex form to the polycarbonate resin, results in a thermoforming blend of particular physical properties, which molds into articles having certain improved properties.

SUMMARY OF THE INVENTION

The invention comprises a process for incorporating a solid form of a fluoropolymer into particles of a polycarbonate resin composition, which comprises;

providing an aqueous dispersion of the solid fluoropolymer wherein its concentration of fluoropolymer ranges from 0.1 to 60 percent by weight of the dispersion;

providing a quantity of the polycarbonate in the form of a plurality of discrete solid particles; and adding the aqueous dispersion to a predetermined situs of the solid particles at a rate of from 0.1 to 9 l per hour in a mixing device.

The invention also comprises the thermoplastic resin composition products of the process of the invention and articles molded therefrom.

DETAILED DESCRIPTION OF THE PREFERRED EMBODIMENTS OF THE INVENTION

The aromatic carbonate polymers useful in the process of the invention include polycarbonates as well as copolyester-carbonates. Polycarbonate and copolyester-carbonates are well known resins, commercially available. Methods of preparing polycarbonates by interfacial polymerization are also well known; see for example the details provided in the U.S. Pat. Nos. 3,028,365; 3,334,154; 3,275,601; 3,915,926; 3,030,331; 3,169,121; 3,027,814; and 4,188,314, all of which are incorporated herein by reference thereto.

In general, the method of interfacial polymerization comprises the reaction of a dihydric phenol with a carbonyl halide (the carbonate precursor).

Although the reaction conditions of the preparative processes may vary, several of the preferred processes typically involve dissolving or dispersing the diphenol reactants in aqueous caustic, adding the resulting mixture to a suitable water immiscible solvent medium and contacting the reactants with the carbonate precursor, such as phosgene, in the presence of a suitable catalyst and under controlled pH conditions. The most commonly used water immiscible solvents include methylene chloride, 1,2-dichloroethane, chlorobenzene, toluene, and the like.

The catalyst employed accelerates the rate of polymerization of the dihydric phenol reactant with the carbonate precursor. Representative catalysts include but are not limited to tertiary amines such as triethylamine, quaternary phosphonium compounds, quaternary ammonium compounds, and the like. The preferred process for preparing polycarbonate resins comprises a phosgenation reaction. The temperature at which the phosgenation reaction proceeds may vary from below 0° C., to above 100° C. The phosgenation reaction preferably proceeds at temperatures of from room temperatures (25° C.) to 50° C. Since the reaction is exothermic, the rate of phosgene addition may be used to control the reaction temperature. The amount of phosgene required will generally depend upon the amount of the dihydric phenols.

The dihydric phenols employed are known, and the reactive groups are the two phenolic hydroxyl groups. Some of the dihydric phenols are represented by the general formula:

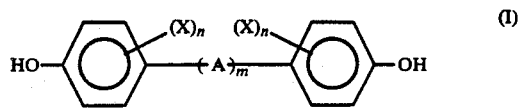

wherein A is a divalent hydrocarbon radical containing from 1 to about 15 carbon atoms; a substituted divalent hydrocarbon radical containing from 1 to about 15 carbon atoms and substituent groups such as halogen; —S—; —SS—; —S(O)—; —S(O)₂—; —O—: or —C—; each X is independently selected from the group consisting of hydrogen, halogen, and a monovalent hydrocarbon radical such as an alkyl group of from 1 to about 8 carbon atoms, an aryl group of from 6-18 carbon atoms, an aralkyl group of from 7 to about 14 carbon atoms, an alkaryl group of from 7 to about 14 carbon atoms, an alkoxy group of from 1 to about 8 carbon atoms, or an aryloxy group of from 6 to 18 carbon atoms; and m is zero or 1 and n is an integer of from 0 to 4.

Typical of some of the dihydric phenols employed are bis-phenols such as bis(4-hydroxy-phenyl) methane, 2,2-bis(4-hydroxyphenyl)propane (also known as bisphenol-A), 2,2-bis(4-hydroxy-3,5-dibromophenyl)-propane; dihydric phenol ethers such as bis(4-hydroxyphenyl) ether, bis (3,5-dichloro-4-hydroxyphenyl) ether; dihydroxydiphenols such as p,p'-dihydroxydiphenyl, 3,3'-dichloro-4,4'-dihydroxydiphenyl; dihydroxyaryl sulfones such as bis(4-hydroxyphenyl) sulfone, bis (3,5-dimethyl-4-hydroxyphenyl) sulfone, dihydroxybenzenes such as resorcinol, hydroquinone, halo- and alkyl-substituted dihydroxybenzenes such as 1,4-dihydroxy-2,5-dichlorobenzene, 1,4-dihydroxy-3-methylbenzene; and dihydroxydiphenyl sulfides and sulfoxides such as bis(4-hydroxyphenyl) sulfide, bis(4-hydroxyphenyl) sulfoxide and bis(3,5-dibromo-4-hydroxyphenyl) sulfoxide. A variety of additional dihydric phenols are available and are disclosed in U.S. Pat. Nos. 2,999,835; 3,028.365 and 3,153,008; all of which are incorporated herein by reference. It is, of course, possible to employ two or more different dihydric phenols or a combination of a dihydric phenol with glycol.

The carbonate precursor can be either a carbonyl halide, a diarylcarbonate or a bishaloformate. The carbonyl halides include carbonyl bromide, carbonyl chloride, and mixtures thereof. The bishaloformates include the bishaloformates of dihydric phenols such as bischloroformates of 2,2-bis(4-hydroxyphenyl)-propane, 2,2-bis(4-hydroxy-3,5-dichlorophenyl)-propane, hydroquinone, and the like, or bishaloformates of glycols such as bishaloformates of ethylene glycol, and the like. While all of the above carbonate precursors are useful, carbonyl chloride, also known as phosgene, is preferred.

Also included within the scope of the present invention are the high molecular weight thermoplastic randomly branched polycarbonates. These randomly branched polycarbonates are prepared by coreacting a polyfunctional organic compound with the aforedescribed dihydric phenols and carbonate precursor. The polyfunctional organic compounds useful in making the branched polycarbonates are set forth in U.S. Pat. Nos. 3,635,895 and 4,001,184 which are incorporated herein by reference. These polyfunctional compounds are generally aromatic and contain at least three functional groups which are carboxyl, carboxylic anhydrides, phenols, haloformyls or mixtures thereof. Some nonlimiting examples of these polyfunctional aromatic compounds include 1,1,1-tri(4-hydroxyphenyl) ethane, trimellitic anhydride, trimellitic acid, trimellitoyl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride, and the like. The preferred polyfunctional aromatic compounds are 1,1,1-tri(4-hydroxyphenyl)ethane, trimellitic anhydride or trimellitic acid or their haloformyl derivatives. Also included herein are blends of a linear polycarbonate and a branched polycarbonate.

The polycarbonate resin used in the process of the invention may be of relatively low weight average molecular weight or of relatively high weight average molecular weight ($M_w$). The lower $M_w$ resins are generally end-capped polycarbonates.

The so-called "end-capped" polycarbonates are prepared by the above-described procedures of producing aromatic carbonate polymers, wherein the reaction mixture includes small amounts of molecular weight regulators or chain terminators to provide end or terminal groups on the carbonate polymer and thereby control the molecular weight of the polycarbonate.

A molecular weight regulator, i.e.; a chain stopper, is generally added to the reactants prior to or during the contacting of them with the carbonate precursor. Useful molecular weight regulators include, but are not limited to, monohydric phenols such as phenol, chroman-I, paratertiarybutylphenol, and the like. A preferred polycarbonate component of the compositions of the invention is one end-capped with p-cumylphenol.

Other compounds that act as chain terminators for the carbonate polymers are also known. Thus, U.S. Pat. No. 3,085,992 discloses alkanol amines as chain terminators; U.S. Pat. No. 3,399,172 teaches imides as chain terminators; U.S. Pat. No. 3,275,601 discloses that aniline and methyl aniline function as chain terminators in the interfacial polymerization process for producing polycarbonates; and U.S. Pat. No. 4,011,184 discloses primary and secondary amines as molecular weight regulators for polycarbonate. Furthermore, U.S. Pat. No. 3,028,365 discloses that aromatic amines and other monofunctional compounds can be used to control or regulate the molecular weight of the polycarbonates, thereby forming aryl carbamate terminal groups. Aromatic polycarbonates having carbamate end groups are disclosed in U.S. Pat. No. 4,111,910. These polycarbonates are prepared using a terminating amount of ammonia, ammonium compounds, primary cycloalkyl, aliphatic or aralkyl amines and secondary cycloalkyl, alkyl or aralkyl amines.

The aromatic carbonate polymers suitable for use in the compositions of the invention include polyester-carbonates, also known as copolyester-polycarbonates, i.e., resins which contain, in addition to recurring polycarbonate chain units of the formula:

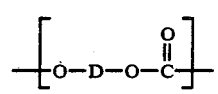

(IIa)

wherein D is a divalent aromatic radical of the dihydric phenol employed in the polymerization reaction, repeating or recurring carboxylate units, for example of the formula:

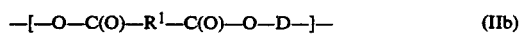

(IIb)

wherein D is as defined above and $R^1$ is as defined below.

The copolyester-polycarbonate resins are also prepared by interfacial polymerization technique, well known to those skilled in the art; see for example the U.S. Pat. Nos. 3,169,121 and 4,487,896.

In general the copolyester-polycarbonate resins are prepared as described above for the preparation of polycarbonate homopolymers, but by the added presence of a dicarboxylic acid (ester precursor) in the water immiscible solvent.

In general, any dicarboxylic acid conventionally used in the preparation of linear polyesters may be utilized in the preparation of the copolyester-carbonate resins. Generally, the dicarboxylic acids which may be utilized include the aliphatic dicarboxylic acids, the aromatic dicarboxylic acids, and the aliphatic-aromatic dicarboxylic acids. These acids are well known and are disclosed for example in U.S. Pat. No. 3,169,121 which is hereby incorporated herein by reference. Representative of such aromatic dicarboxylic acids are those represented by the general formula:

$$HOOC-R^1-COOH \qquad (III)$$

wherein $R^1$ represents an aromatic radical such as phenylene, naphthylene, biphenylene, substituted phenylene and the like; a divalent aliphatic-aromatic hydrocarbon radical such as an aralkyl or alkaryl radical; or two or more aromatic groups connected through non-aromatic linkages of the formula:

—E— wherein E is a divalent alkylene or alkylidene group. E may also consist of two or more alkylene or alkylidene groups, connected by a non-alkylene or alkylidene group, such as an aromatic linkage, a tertiary amino linkage, an ether linkage, a carbonyl linkage, a silicon-containing linkage, or by a sulfur-containing linkage such as sulfide, sulfoxide, sulfone and the like. In addition, E may be a cycloaliphatic group of five to seven carbon atoms, inclusive, (e.g. cyclopentyl, cyclohexyl), or a cycloalkylidene of five to seven carbon atoms, inclusive, such as cyclohexylidene. E may also be a carbon-free sulfur-containing linkage, such as sulfide, sulfoxide or sulfone; an ether linkage; a carbonyl group; a direct bond; a tertiary nitrogen group; or a silicon-containing linkage such as silane or siloxy. Other groups which E may represent will occur to those skilled in the art. For purposes of the present invention, the aromatic dicarboxylic acids are preferred. Thus, in the preferred aromatic difunctional carboxylic acids of the formula (III), $R^1$ is an aromatic radical such as phenylene, biphenylene, naphthylene, or substituted phenylene. Some non-limiting examples of aromatic dicarboxylic acids which may be used in preparing the poly(ester-carbonate) or polyarylate resins of the instant invention include phthalic acid, isophthalic acid, terephthalic acid, homophthalic acid, o-, m-, and p-phenylenediacetic acid, and the polynuclear aromatic acids such as diphenyl dicarboxylic acid, and isomeric naphthalene dicarboxylic acids. The aromatics may be substituted with Y groups. Y may be an inorganic atom such as chlorine, bromine, fluorine and the like; an organic group such as the nitro group; an organic group such as alkyl; or an oxy group such as alkoxy, it being only necessary that Y be inert to and unaffected by the reactants and the reaction conditions. Particularly useful aromatic dicarboxylic acids are those represented by the general formula:

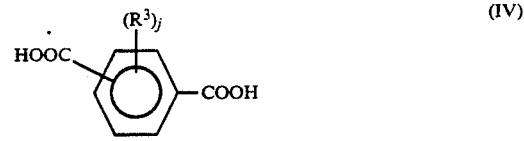

wherein j is a positive whole integer having a value of from 0 to 4 inclusive; and each $R^3$ is independently selected from the group consisting of alkyl radicals, preferably lower alkyl (1 to about 6 carbon atoms).

Mixtures of these dicarboxylic acids may be employed. Therefore, where the term dicarboxylic acid is used herein it is to be understood that this term includes mixtures of two or more dicarboxylic acids.

Most preferred as aromatic dicarboxylic acids are isophthalic acid, terephthalic acid, and mixtures thereof. A particularly useful difunctional carboxylic acid comprises a mixture of isophthalic acid and terephthalic acid wherein the weight ratio of terephthalic acid to isophthalic acid is in the range of from about 10:1 to about 0.2:9.8.

Rather than utilizing the dicarboxylic acid per se, it is possible, and sometimes even preferred, to employ the reactive derivatives of said acid. Illustrative of these reactive derivatives are the acid halides. The preferred acid halides are the acid dichlorides and the acid dibromides. Thus, for example instead of using isophthalic acid, terephthalic acid or mixtures thereof, it is possible to employ isophthaloyl dichloride, terephthaloyl dichloride, and mixtures thereof.

The proportions of reactants employed to prepare the copolyester-carbonate resins will vary in accordance with the proposed use of the blends of the invention containing this product resin. Those skilled in the art are aware of useful proportions, as described in the U.S. patents referred to above. In general, the amount of the ester bonds may be from about 5 to about 90 mole percent, relative to the carbonate bonds. For example, 5 moles of bisphenol A reacting completely with 4 moles of isophthaloyl dichloride and 1 mole of phosgene would give a copolyester-carbonate of 80 mole percent ester bonds.

The preferred polycarbonates for use in the present invention are those derived from bisphenol A and phosgene and having an intrinsic viscosity of about 0.3 to about 1.5 deciliters per gram measured in methylene chloride at a temperature of 25° C. and a porosity within the range of from 0.00 to 2.0 ml/gm.

The polycarbonate resin is used in the process of the invention in a discrete solid particle form, having an average diameter within the range of from about 1 micron to about 2 mm. Such particles may be granular or powdered particles or may be the product of a pelletizing procedure where pellets are produced by chopping strands of the extruded resin.

The fluoropolymer additives used in the process of the invention are fluorinated polyolefins.

The partially fluorinated polyolefins include, but are not limited to, poly(vinylidene fluoride), poly(vinyl fluoride), poly(trifluoroethylene), poly(chlorortrifluoroethylene) and poly(trifluoroethylene alkali metal sulfonate).

The partially fluorinated polyolefins which are most useful in the present invention, as well as methods for their preparation, are described inter alia in Billmeyer, Fred W., Jr. Textbook of Polymer Science, Interscience Publishers, New York, N.Y., 1966, pp. 425-427; Monermoso, J. C., Rubber Chem. Tech., 34, 1521 (1961); and Rudner, M. A. Fluorocarbons, Reinhold Publishing Corp., New York, N.Y., and U.S. Pat. No. 4,663,391 which is incorporated herein by reference.

The polytetrafluoroethylene resin employed in the process and compositions of this invention is preferred and preferably is of a fibrillar form.

PTFE is a finely-divided powder or fluff as obtained from the polymerization reaction. When a mass of this finely-divided, untreated polytetrafluoroethylene resin of average particle size 0.1 to 0.2 micron, such as that illustrated in FIGS. 1 and 2 of the article "TEFLON" Tetrafluoroethylene Resin Dispersion by J. F. Lontz and W. B. Happoldt, Jr. in Ind. and Eng. Chem. vol. 44, p. 1800, 1952, is sheared by rubbing in the hands, the particles tend to stick together and form a coherent mass. If this mass is drawn out and examined with a microscope at 50-100X, it shows fibers of various sizes. Examination with an electron microscope shows that these fibers are bundles of smaller fibers, many of which consist of strings of the primary particles held together by very fine fibrils having diameters from one-fourth to one-tenth or less of the diameter of the particles. Polytetrafluoroethylene which has the ability of causing the particles to adhere and draw out into ultrafine fibrils when they are rubbed together with mechanical shearing, is preferred for use in the practice of this invention.

Microscopic examination of a product of this invention reveals the presence of polytetrafluoroethylene particles having a generally fibrous structure, although, as is the case when the polytetrafluoroethylene particles alone are rubbed together, many of the finest fibers are below the range of visibility at 100X magnification. If desired, the polytetrafluoroethylene particles can be given a micro-fibrous structure before incorporation in the base resin by subjecting them to high rates of shear when dispersed in suitable medium such as oil, or in a process such as water-cutting, whereby micro-fibers having diameters of less than 2 microns are obtained.

The amount of fluoropolymer which is incorporated into the polycarbonate resin by the process of the invention may be within the range of from about 0.01 to about 70 parts by weight for each 100 parts of the polycarbonate, preferably from about 7 to about 30 parts and more preferably from about 8 to about 20 parts.

The fluoropolymer is preferably used as an aqueous dispersion thereof, the dispersed particles having a preferred size (diameter) of from 0.05 to 0.5 microns (average).

In accordance with the process of the invention, the two components, i.e., the polycarbonate resin particles and the fluoropolymer are mixed together at ambient temperatures and at prescribed rates, employing conventional mixing equipment, such as the prior art apparatus described above. In general, the mixtures of components may be blended by mixing in conventional mixing rolls, dough mixers, Banbury mixers and the like. Representative of known and useful apparatus for coating particulate materials with a homogeneous, liquid is that described in U.S. Pat. No. 3,716,020 (De Wit et al.) issued Feb. 18, 1973, and incorporated herein by reference thereto.

The rate at which the two components are brought in contact with each other is critical to the process of the invention and accounts for the physical advantages associated with the resulting blend. The rate at which the two resin components are brought in contact with each other is advantageously within the range of from 0.1 to 9 liters per hour at a single, predetermined site of contact. The addition need not be continuous, but preferably is at a substantially uniform rate over a given period of time. One advantageously avoids a "dumping" of the fluoropolymer into the polycarbonate, but instead seeks to achieve a metering of the fluoropolymer into the polycarbonate resin at the predetermined site. With agitation or movement of the contacted polycarbonate resin particles in and out of the predetermined site, fresh surfaces and fresh particles of the plurality of polycarbonate resin particles are continually brought into contact with the metered in fluoropolymer so that "dumping" of the latter is avoided. In a further embodiment process of the invention, the fluoropolymer may be brought into contact with the polycarbonate particles by a spray application of the fluoropolymers onto a bed of the polycarbonate particles, preferably while the particles are being moved and mixed on a rotating drum, pan or kettle, baffled or unbaffled. One representative rotary drum is described in Defensive Publication T927,005 published Oct. 1, 1974. This means of admixture may be advantageous to reduce the overall time necessary for incorporating the fluoropolymer into the polycarbonate resin.

In effect, spraying brings the fluoropolymer and the particles of polycarbonate resin together at a plurality of predetermined sites rather than at a single contact site. The rate of application of the fluoropolymer at each site is advantageously within the aforementioned range. It will be appreciated that when multiple predetermined contact sites are available by means of a spray, the overall time required for affecting a complete dispersion of the fluoropolymer into the polycarbonate is reduced in direct proportion with the number of spray contact sites.

The total mixing time used to complete the homogeneous mixing of the two components is not critical, so long as the rate of contact is adhered to. In general, the total mixing time employed is a function of and is dictated by a desire to achieve a certain dryness of the blend, i.e., removal of the aqueous portion of the fluoropolymer dispersion. The functional heat resulting from movement of the resin particles against each other is sufficient to evaporate the water, advantageously to achieve a dryness of about 1.0 percent or less.

Devices for spraying aqueous dispersions of solid particles are generally well known; see for example the sprayers described in the U.S. Pat. Nos. 1,140,453; 2,249,359; 2,325,112; 2,647,796; 3,452,931; 3,581,997, and 3,901,449. Both compressed air operated sprayer devices or the "airless" spray devices may be used. In general, it is advantageous to employ the air-driven type of sprayer for relatively dilute fluoropolymer latexes (less than 30 percent solids content). Higher solids contents are preferably sprayed from the airless sprayers.

In a preferred embodiment process of the invention, admixture of the polycarbonate resin and the fluoropolymer is carried out in the presence of a non-ionic surfactant.

The term "surfactant" as used herein is a contraction of "surface-active agent" and is a broadly descriptive term used to describe a chemical compound which is (1) soluble in at least one phase of a system, (2) has an amphipathic structure, (3) the molecules of which form oriented monolayers at phase interfaces, (4) exhibits an equilibrium concentration as a solute at a phase interface, greater than its concentration in the bulk of the solution, (5) forms micelles when the concentration as a solute in solution, exceeds a characteristic limiting value and (6) exhibits some combination of the functional properties of detergency, foaming, wetting, emulsifying, solubilizing and dispersing.

The non-ionic surfactants used in the preferred process of the invention are generally well known compounds and include, for example, the alkylphenoxypoly (ethyleneoxy) ethanols and nonylphenoxypoly (ethyleneoxy) ethanols having polyoxyethylene moieties of from 9 to 10 units in length. Other non-ionic surfactants which may be employed are represented by polyethylene oxides, polypropylene oxides, long chain alkyl phosphine oxides, amine oxides and the like. The only specific requirement for the non-ionic surfactant used in the method of the invention is that the particular non-ionic surfactant selected be a non-solvent for the polycarbonate polymer, i.e., the polycarbonate polymer be substantially insoluble in the non-ionic surfactant. Those skilled in the art have the level of knowledge required to make such selections or can readily determine by trial and error techniques those non-ionic surfactants meeting this requirement for a particular polymer.

The surfactant presence is advantageously within the range of from about 0.001 to 10 weight percent of the fluoropolymer.

The thermoplastic compositions of the invention may also be compounded with conventional molding aids such as, for example, antioxidants; antistatic agents; inert fillers such as glass, talc, mica, and clay; ultraviolet radiation absorbers such as the benzophenones, benzotriazoles, and the like; hydrolytic stabilizers such as the epoxides disclosed in U.S. Pat. Nos. 3,489,716, 4,138,379 and 3,839,247, all of which are incorporated herein by reference; color stabilizers such as the organophosphites; thermal stabilizers such as phosphite; mold release agents and flame retardants. Some particularly useful flame retardants are the alkali and alkaline earth metal salts of sulfonic acids. These types of flame retardants are disclosed in U.S. Pat. Nos. 3,933,734; 3,931,100; 3,978,024; 3,948,851; 3,926,980; 3,919,167; 3,909,490; 3,953,396; 3,953,300; 3,917,559; 3,951,910 and 3,940,366, all of which are hereby incorporated herein by reference.

In another embodiment process of the invention, a PFTE concentrate formulation comprising 5 to 40 wt % of PTFE mixed with particles of a polycarbonate resin is first prepared by the method described above. The resulting formulation is then added to a desired grade of polycarbonate resin along with any other required additives followed by a blending cycle. The amount of PTFE concentrate formulation added will depend on the desired amount of PTFE in the final product.

The following examples describe the manner and process of making and using the invention and set forth the best mode contemplated by the inventor of carrying out the invention but is not to be construed as limiting. In carrying out the examples, the following tests were employed:

NOTCHED IZOD IMPACT STRENGTH

Test Method ASTM D-256; all specimens were 100% ductile at failure, unless otherwise noted.

FLAMMABILITY

UL-94 method of Underwriter's Laboratory.

INTRINSIC VISCOSITY (I.V.)

The intrinsic viscosity of polycarbonate resins was determined in methylene chloride at a temperature of 25° C., and is reported in deciliters/gm.

EXAMPLE 1

To 90.8 kilograms of polycarbonate resin powder (General Electric, Co. Lexan ® 140 grade powder, i.v. of 0.51) in a ribbon blender is added an aqueous PTFE Latex (ICI, FLUON AD-1; 60% PTFE) at the rate of 4.2 liters per hour (single drip site) until a total of 37.7 kilograms of the Latex has been added. During the addition, the resin powder is agitated by the rotating stainless steel ribbon in the blender. After complete addition, blending was continued in order to effect drying. The drying is effected by the heat generated by the blender itself as a result of friction from the blending process. The temperature in the blender reaches about 60° C. during the blending. The blending is continued until the moisture level in the powder reaches a level of <1%. Analysis of filterables showed 20.6% PTFE, by weight.

EXAMPLE 2

A thermoplastic molding formulation was prepared by adding 0.6% of the PTFE concentrate prepared in Example 1 supra to General Electric, Company Lexan ® grade polycarbonate resin powder. In addition, a flame retardant salt, 0.3%, a brominated flame retardant, 0.2%, a mold release agent, 0.56%, a heat stabilizer, 0.03%, titanium dioxide pigment, 0.3% and a combination of dyes, <0.04% to give a grey color were added. The formulation was mixed, extruded and chopped into pellets and molded into test parts. Test results are tabulated below.

COMPARATIVE EXAMPLE 3 (NOT OF THE INVENTION)

A PTFE concentrate was made having the same formulation as Example 1 supra, except that the Latex was added by pouring it into the polycarbonate resin powdered particles completely within 30 minutes. The drying procedure was the same. This concentrate was used in a thermoplastic molding formulation as in Example 2, supra. Test results are included in the Table below.

EXAMPLE 4

8.2 grams of a water-soluble flame retardant salt was dissolved in 1.4 liters of water to which was added 2 ml of Triton ® X-100 non-ionic surfactant. To this solution was added 5.3 gm. of a PTFE Latex (ICI Fluon ® AD-1) with stirring. The resulting solution was sprayed onto 2.724 kilogram of a polycarbonate powder (General Electric Co., Lexan ® 140 grade) contained in a pot. The sprayer used was a cleaned empty container of 409 kitchen cleaner fluid (Clorox ®). As the solution was sprayed, the powder was manually stirred with a spatula. After complete addition, the powder was further shaken in the pan using a paint shaker. It was then dried for 16 hours in an oven at 110° C. The dried powder was then extruded chopped into pellets and molded into test parts. The test results are included in the Table below.

TABLE

| | COMPARATIVE Example 3 | INVENTION Example 2 | INVENTION Example 4 |
|---|---|---|---|
| Part Appearance (3.2 mm round disc) | streaks, gate blush, pittings | minor pittings | smooth |
| Falling Dart Impact, (J) (Std. Deviation) | 48.6 7.6 | 55.4 1.2 | — — |
| Notched Izod (3.2 mm) | 0.77 | 1.17 | 1.08 |
| Ductility | 60% | 100% | 100% |
| range (Kg/cm$^2$) | 0.19–1.12 | 1.12–1.23 | 1.03–1.18 |
| UL94, 1.6 mm (average flame out time in seconds) | VO(4) | VO(3) | V1*(7) |

*The V1 rating in Example 4 is due to the fact that less flame retardant was used in the formulation.

From the Table it can be seen that the process of the instant invention results in improved products with respect to appearance and physical properties. The advantage of the resulting improved dispersion of this invention is especially seen in the more consistent impact data in Example 2 than in comparative Example 3. Given the same amount of flame retardant, the same flammability property is also obtained.

What is claimed is:

1. A process for incorporating 0.01 to about 70 parts by weight of a solid form of a fluoropolymer into 100 parts by weight of particles of a polycarbonate resin composition, which comprises:

providing the fluoropolymer in an aqueous dispersion of particles having a diameter of from 0.05 to 0.5 microns, wherein the concentration of fluoropolymer ranges from 0.1% to 60% by weight of the dispersion;

providing the polycarbonate in the form of a plurality of discrete solid particles having a diameter within the range of from about 1 micron to about 2 mm;

adding the aqueous dispersion to a predetermined situs of contact of the solid polycarbonate particles at a rate of from 0.1 to 9 liters per hour; and simultaneously mixing the added dispersion and the solid polycarbonate particles together, whereby there is an agitation and movement of the polycarbonate resin particles in and out of the predetermined situs so that non-contacted particles of the plurality of polycarbonate resin particles are continually brought into contact with the metered-in fluoropolymer.

2. The process of claim 1 wherein adding and mixing comprises spray application of the fluoropolymer onto moving particles.

3. The process of claim 1 wherein adding and mixing comprises drip of the fluoropolymer onto tumbling particles.

4. The process of claim 1 wherein mixing is carried out in the presence of a surface active proportion of a non-ionic surfactant.

5. The process of claim 1 wherein adding is by metering the aqueous dispersion at a substantially uniform state over the period adding occurs.

* * * * *